Aug. 30, 1960

W. C. GOTHE ET AL 2,951,146

SOLDER APPLYING UNIT

Filed July 24, 1958

INVENTORS W. C. GOTHE
J. O. HINKLE
BY
*W. A. Johnson*
ATTORNEY

Aug. 30, 1960  W. C. GOTHE ET AL  2,951,146
SOLDER APPLYING UNIT

Filed July 24, 1958  5 Sheets-Sheet 3

INVENTORS W.C. GOTHE
J.O. HINKLE
BY
ATTORNEY

Aug. 30, 1960

W. C. GOTHE ET AL 2,951,146

SOLDER APPLYING UNIT

Filed July 24, 1958

INVENTORS W. C. GOTHE
J. O. HINKLE
BY
ATTORNEY

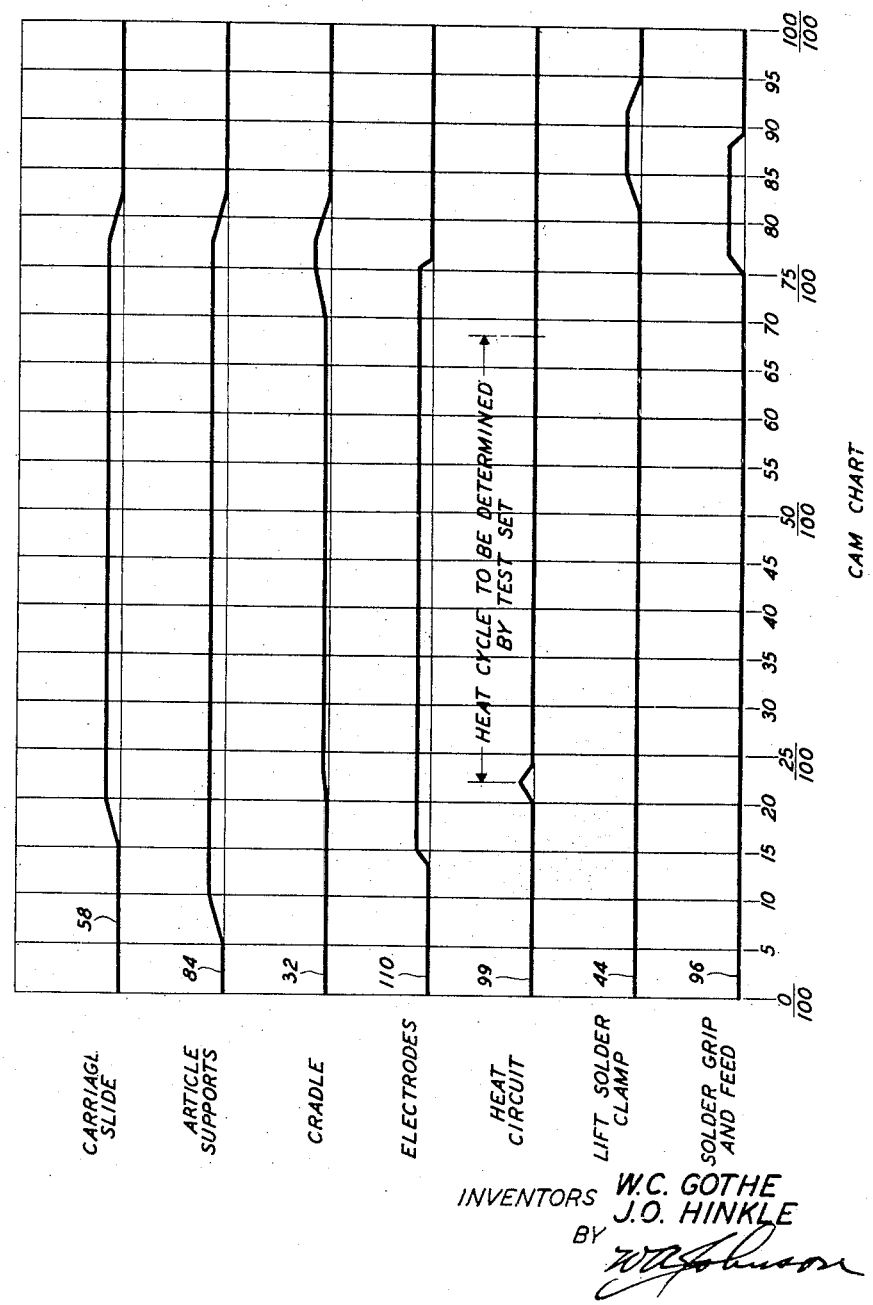

United States Patent Office 2,951,146
Patented Aug. 30, 1960

2,951,146
SOLDER APPLYING UNIT

Walter C. Goihe, Macungie, and James O. Hinkle, Emmaus, Pa., assignors to Western Electric Company, Incorporated, New York, N.Y., a corporation of New York Filed July 24, 1958, Ser. No. 750,799

6 Claims. (Cl. 219—85)

This invention relates to soldering apparatus particularly apparatus for depositing quantities of solder on metallic articles.

In manufacturing operations it is often necessary to apply a quantity of fusible material such as solder to each of a succession of parts which are to be further processed in an assembly operation. For example, in the manufacture of transistors, a metallic ribbon of a given length is fed to pairs of grippers in a turret-type machine, as shown in the co-pending application of R. C. Shafer, Serial No. 745,338 filed June 30, 1958, so that these metallic articles or ribbons may be moved successively and intermittently into an applying station. In this case each ribbon is to have a section cut from the center thereof, and the adjacent inner ends of the remaining metallic ribbon portions are to be bent downwardly to form faces to which the ends of a transistor bar are to be secured by the aid of solder. It is necessary that quantities of solder be placed accurately on the portions of the ribbon to be secured to the bar. These quantities of solder are to be applied to the metallic ribbon prior to the cutting and bending operations.

An object of the present invention is an apparatus for efficiently and accurately depositing like quantities of fusible material at predetermined locations on a metallic article.

According to the object the invention comprises an apparatus for depositing a quantity of fusible material on a metallic article, after the article is moved into an applying station where means is actuable to lay an end portion of a ribbon of the material on a surface of the article, after which means is actuated to fuse the end portion to the surface of the article and subsequently, means is actuated to move the ribbon relative to the article to break the ribbon from the fused end portion thereof.

More specifically, the apparatus includes a cradle having a guide mounted thereon for a ribbon of solder, a unit mounted on the cradle to advance the ribbon of solder a predetermined distance to move the leading end thereof a known distance beyond the guide and a carriage supporting the cradle to move it to position the leading end of the solder ribbon over the article. The cradle is then rocked a given distance in one direction to lay the leading end portion on the article, which by this time has been heated to melt the leading end portion of the solder and the cradle is rocked a further distance in the same direction to break the ribbon from the melted end portion thereof.

Other objects and advantages will be apparent from the following detailed description when considered in conjunction with the accompanying drawings, wherein:

Fig. 7 is a chart illustrating the actions of the various cams.

Figure 1:
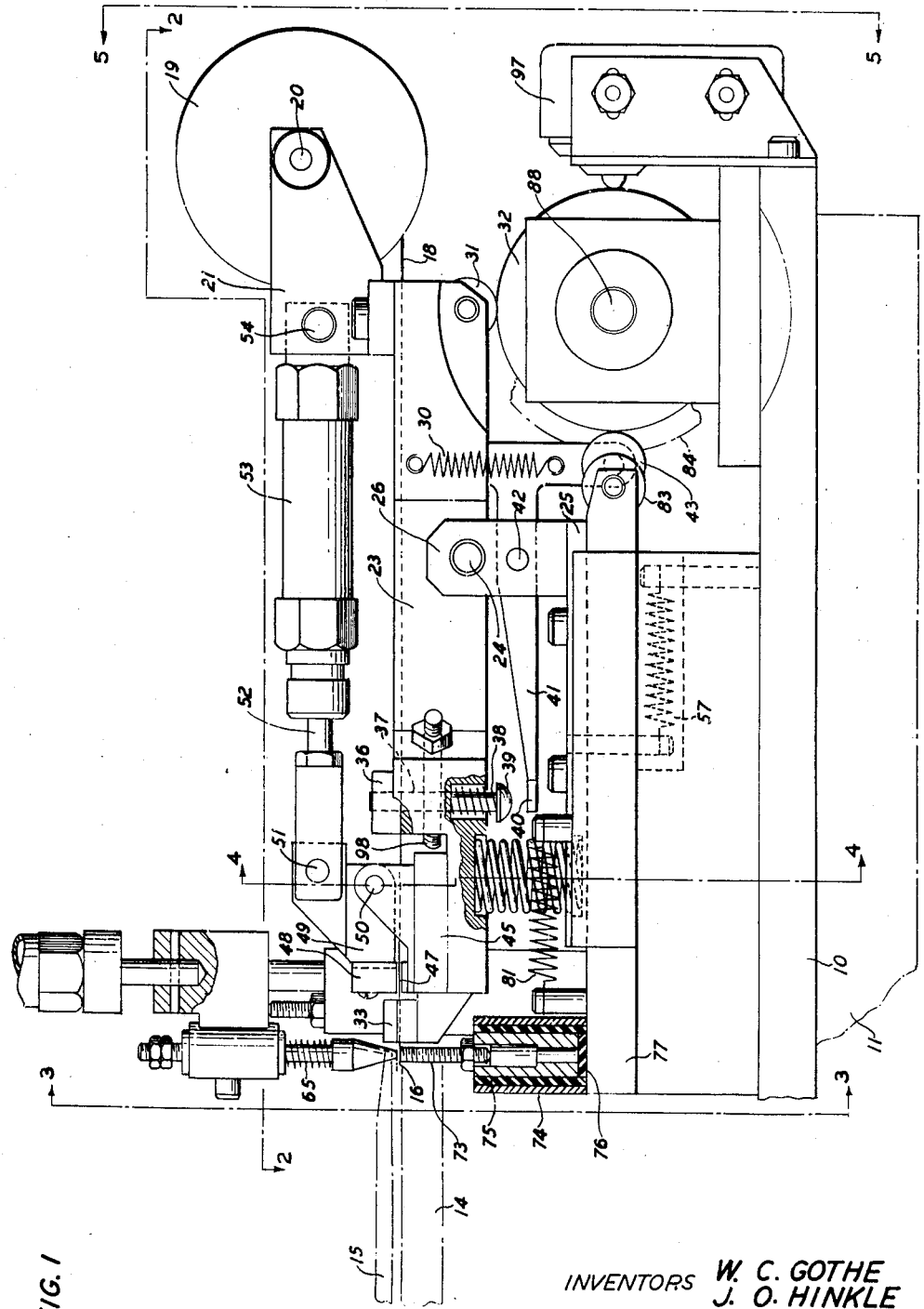
Fig. 1 is a side elevational view of the apparatus shown in combination with a turret-type article feeding machine.

The apparatus includes a frame-like structure 10 mounted on a stationary support 11 at an applying station of an article forming machine wherein a turret 12 is rotated intermittently about its axis and has grippers 14 and 15 mounted in parallel pairs at spaced positions about the periphery of the turret to receive and firmly grip the ends of flexible metallic ribbons 16 and move them into the applying station where they are held during the intervals of rest for a predetermined length of time.

Figures 3, 4:
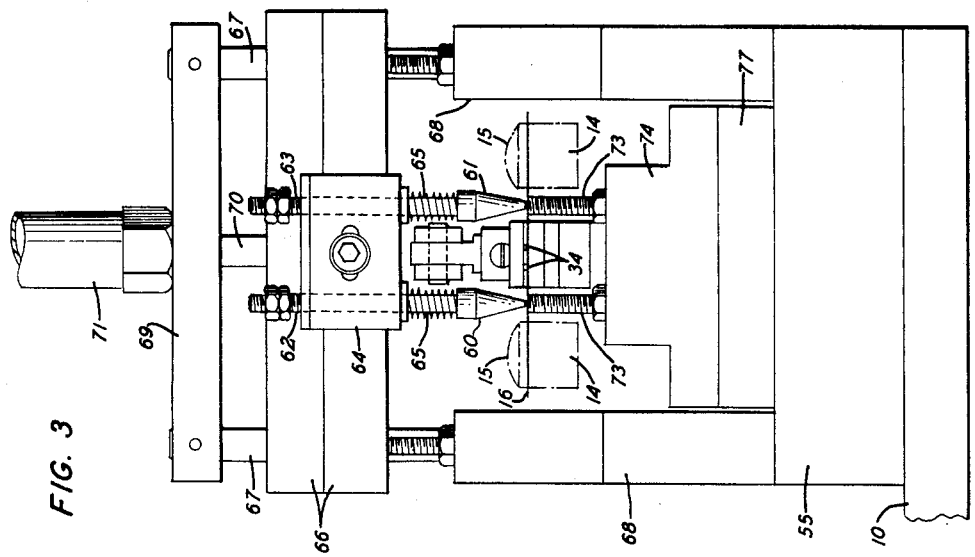
Fig. 3 is a vertical sectional view taken along the line 3—3 of Fig. 1.
Fig. 4 is a fragmentary vertical sectional view taken along the line 4—4 of Fig. 1.

The apparatus is to apply two quantities of solder at predetermined spaced positions on the article 16. The part 16 initially described as a ribbon will hereafter be described as a metallic article as it is desirable to apply the term "ribbon" to the two supplies of solder 18. The solder ribbons 18 are removed from spools 19 rotatably mounted at 20 between arms of a bracket 21 which is fixedly mounted at 22 on a cradle 23. The cradle 23 is pivotally supported at 24 on a carriage 25, the carriage having a U-shaped bracket 26 mounted thereon as shown in Fig. 4 to straddle the adjacent portion of the cradle and support its pivot 24. A spring 30 normally urges the cradle clockwise, Fig. 1, causing a cam roller 31 to ride upon its cam 32. The forward or left end of the cradle 23 has a guide unit 33 mounted thereon, this unit having spaced apertures 34 therein as shown in Fig. 3 to guide accurately the solder ribbons 18 and to control the positions of the leading ends of the ribbons. A solder clamp 36 adapted to extend across the solder ribbons 18 is positioned short of the guide 33 on the cradle 23 and is connected to a push-rod 37. The push-rod 37 is slidably disposed in an aperture in the cradle 23, normally urged downwardly to hold the clamp 36 against the ribbons 18 by a spring 38, and has a head 39 disposed in alignment with an end 40 of a lifting lever 41. The lever 41 is pivotally mounted at 42 on the bracket 26, beneath the cradle 23 and has a cam roller 43 caused to follow its cam 44 by spring 30.

A solder feeding unit includes a lower member 45 positioned to slide on the carriage 23, between guides 46, Fig. 4, and is provided with an upper surface 47 over which the ribbons 18 may pass. A gripping member 48, mounted on a lever 49, pivoted at 50 on the member 45, is pivotally connected at 51 to a piston rod 52 of an air cylinder 53. The air cylinder is pivotally mounted at 54 between the arms of the bracket 21 and is thereby carried by the cradle 23.

The carriage 25 slidable longitudinally on a surface 55 between guides 56 is normally urged to the right by a spring 57 to follow the action of its cam 58.

A pair of electrodes 60 and 61 are mounted upon the lower ends of rods 62 and 63 movably supported in a dielectric arm 64 and urged downwardly by the aid of springs 65 which act as cushions for the electrodes. The arm 64 is supported by a guide 66, mounted upon rods 67 which extend upwardly from parallel members 68 of the base 10 and are connected by a horizontal bar 69 at their top ends. A piston rod 70 of an air cylinder 71, which is fixedly supported by the bar 69, extends through the bar and is connected to the guide 66 to cause movement of the electrodes into and out of engagement with spaced portions of the article 16.

Supports 73 are mounted at spaced positions on a member 74 but insulated from each other and from the member by individual dielectric sleeves 75 and disk-like members 76, Fig. 1. The member 74 is fixed to a slide 77 disposed upon a surface 55, a reduced portion 79 of which has its longitudinal movements controlled by a guide 80. A spring 81 normally urges the slide 77 toward its starting position to the right and out of the path of the grippers 14 and 15 causing its roller 83 to follow the contour of its cam 84.

Figure 5:
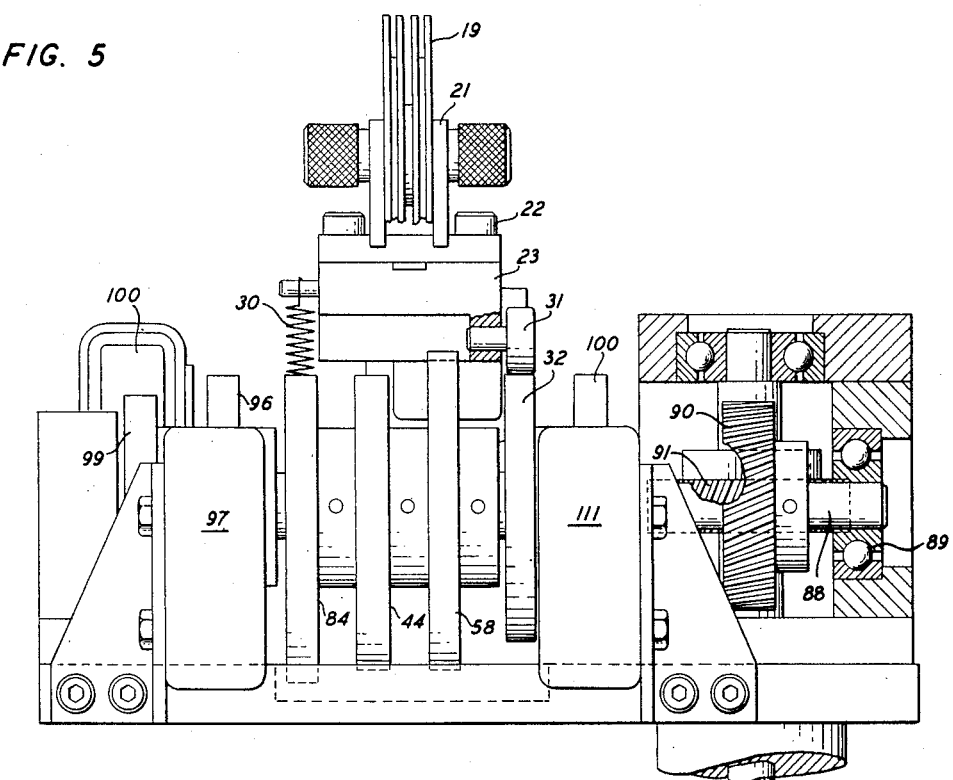
Fig. 5 is a rear elevational view of the apparatus.
Figure 6:
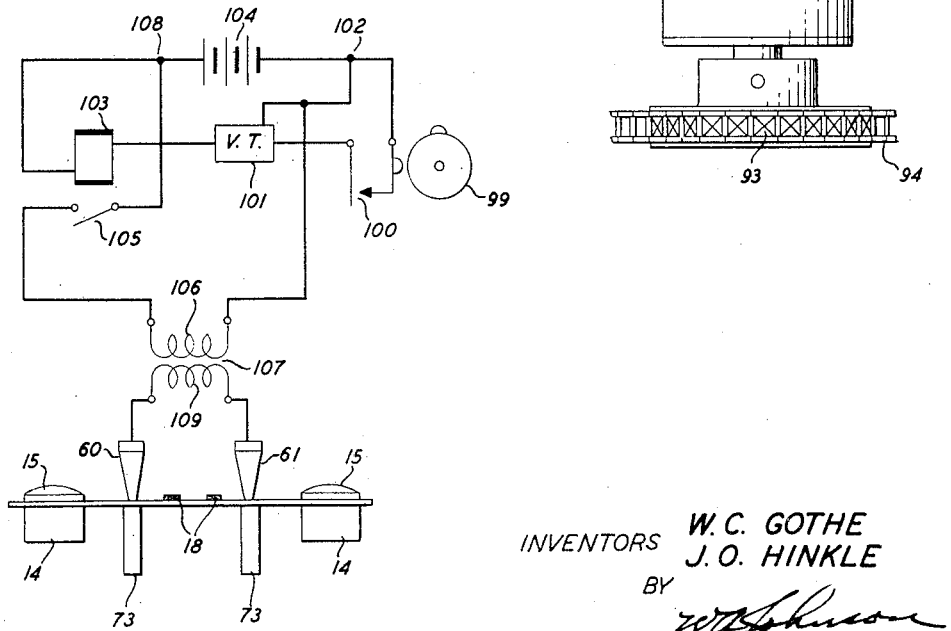
Fig. 6 is a schematic wiring diagram.

The cams 32, 44, 58 and 84 are mounted on a cam shaft 88 which is journaled in suitable bearings 89 and has a gear 90 mounted thereon with interengagement with a gear 91 of a drive shaft 92. The drive shaft 92 has a sprocket 93, Fig. 5 mounted on the lower end thereof, which is driven by a chain 94 from a power source causing intermittent rotation of the drive shaft to complete one cycle of rotation of the cam shaft during the intervals of rest of the turret 12. The cam shaft 88 has a cam 96 mounted thereon to operate a switch 97 to operate a solenoid valve, not shown, to cause operation of the air cylinder 53 at predetermined intervals. Operation of the air cylinder causes the feeding unit to move the gripping member 48 from its open position to its closed position, when it will grip the solder ribbons on the surface 47. This portion of the operation takes place with the member 45 back against an adjustable stop 98. After this action of feeding unit additional force on the piston rod 52 will move the unit into engagement with a stop adjacent the guide 33 to feed a given length of each solder ribbon through the guide.

A cam 99 on the cam shaft 88 operates a switch 100 to start the heating cycle for the electrodes 60 and 61.

As shown in Fig. 7, the cam 99 closes a switch 100 momentarily to electrically actuate a time control unit 101 which will immediately complete a circuit from connection 102 through relay 103 to a supply of electrical energy or battery 104. The relay 103, when energized, will close its connection 105 to complete a circuit from one side of battery 104, at connection 102, through a primary winding 106 of a transformer 107, through closed contact 105 to the other side of the battery, through connection 108. A secondary winding 109 of the transformer 107 is in a circuit including electrode 60, a portion of the article 16, between the electrodes, and electrode 61. As a result, the last-mentioned circuit, which may be described as a heating circuit, remains closed a length of time controlled by the timing unit 101 to heat the central area of the article sufficiently to melt the end portions of the solder ribbons 18.

A cam 110, mounted on the cam shaft 88, operates a switch 111 which closes a circuit, not shown, through a solenoid valve to open a supply line of fluid under pressure to the air cylinder 71 to move the upper electrodes 60 and 61 downwardly into engagement with the article and under suitable pressure to provide desired electrical connections between the electrodes and the spaced portions of the article.

*Operation*

Figure 2:
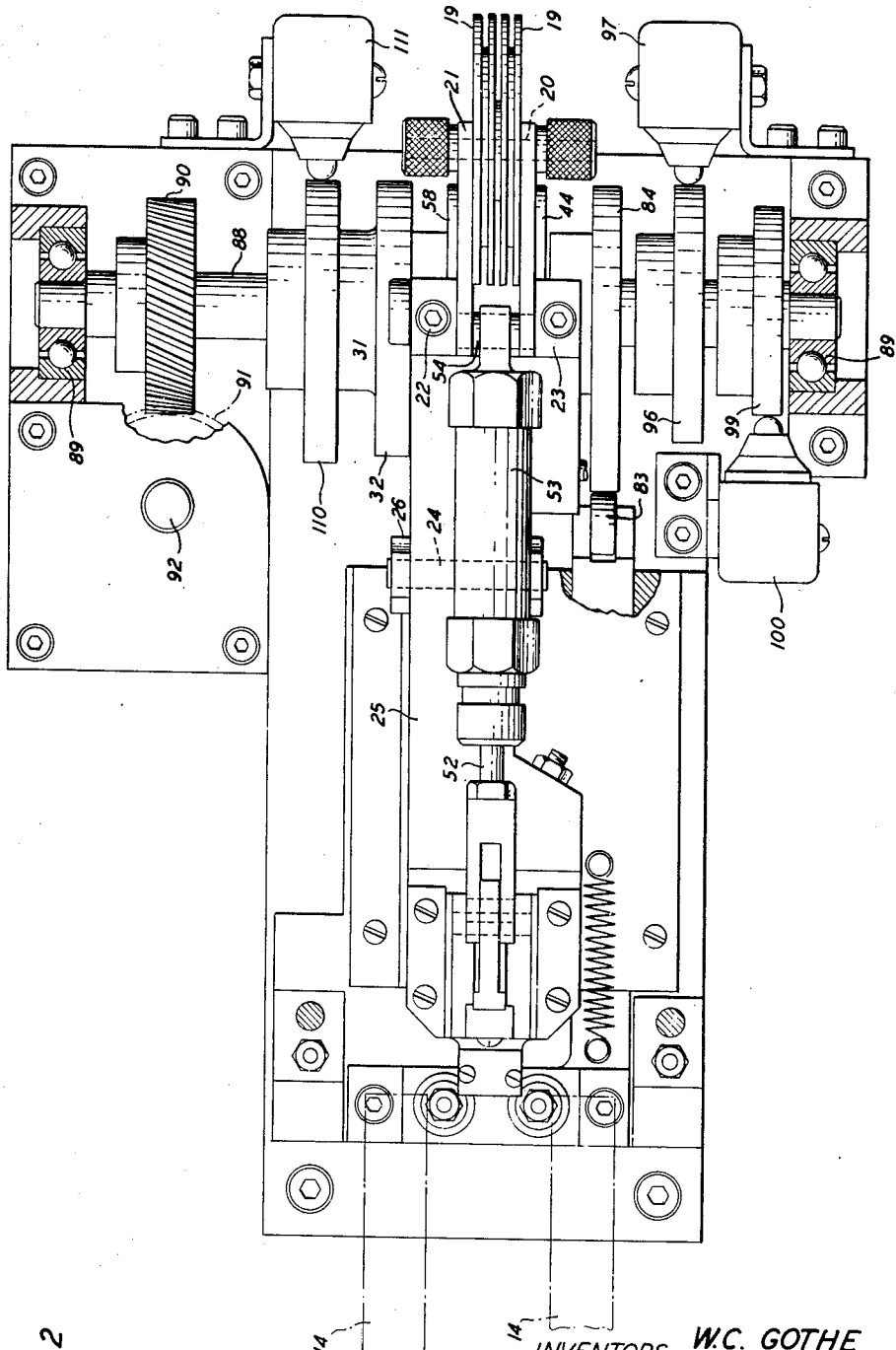
Fig. 2 is a top plan view of the apparatus.

Briefly, the sequence of operation may be followed viewing the cam chart in Fig. 8 which illustrates one complete cycle of the cam shaft and is divided, by 5/100 lines, into one hundred parts to illustrate the relative actions of the various cams. Cam 84 is first to actuate its associated parts, which are the article supports 73, to move them beneath predetermined spaced portions of the article 16 and hold them in this position for the major portion of the cycle. Cam 110 is next to function moving the electrodes 60 and 61 downwardly into engagement with the article 16 under pressures of the springs 65 and in alignment with their respective supports 73. With the predetermined lengths of solder ribbons 18 previously advanced beyond the guide 33, cam 58 operates to move the carriage to the left, Figs. 1 and 2, to position the leading end portions of the solder ribbons over the article 16. The next cams to be affected are cams 32 and 99. Cam 99, as shown in the wiring diagram in Fig. 7, closes switch 100 to start the heating circuit under the control of the timing unit 101 to cause the heating current to pass from the secondary winding 109 of transformer 107 through the portion of the article 16, the electrode 61 and back to the winding 109. This heating current is applied during a length of time sufficient to heat the portion of the article 16 between the electrodes 60 and 61 and to melt the end portions of the solder ribbon resting thereon. Cam 32 has a short rise beginning at line 20 of the chart and continuing to line 70 of the chart to cause rocking motion of the cradle 23 a distance sufficient to lay the end portions of the solder ribbons on the article and hold them firmly thereon during the heating period so that these portions of the solder ribbons will melt and remain on the article. It should be mentioned that at a previous position in association with the turret 12, suitable quantities of flux have been placed on the article in the exact areas where the ends of the solder ribbons are located. After the ends of the solder ribbons have melted and the cam cycle has reached line 70 of the chart, a higher portion of the cam 32 causes additional counterclockwise rocking of the cradle 23 about its pivot 24 to cause the guide 33 to move the solder ribbons 18 downwardly relative to the article 16 to break the ribbons from the melted end portions which remain on the article. Prior to the completion of the functions of the high portions of cams 58, 84 and 32 the high portion of cam 110 has terminated its action and the electrodes 60 and 61 are caused to move upwardly, returning to their normal positions. The high portions of cams 58, 84 and 32 terminate approximately at the same time respectively returning the carriage 25, the supports 73 and the cradle 23 to their normal or starting positions. In the last one-quarter cycle of the cam shaft, cams 44 and 96 function to respectively free the solder ribbons for advancement and to advance the ribbons longitudinally measured like distances to move their new leading end portions through the guide 33 ready for the next operating cycle. Although the high portion of cam 96, for operating the feeding unit 45, begins to function in advance of the high portion of cam 44 raising or releasing the clamp 36, it should be understood that various things happen before the unit feeds the solder ribbons. The first action of the high portion of cam 96 is to operate switch 97 to close a circuit (not shown) through a solenoid valve, which when open, will direct fluid under pressure to the air cylinder 53 to move its piston rod to the left. The first portion of the movement of the piston rod must rock the lever 49 to move the clamping member 48 forcibly against the ribbons 18 where they are held against the surface 47. After all this takes place, additional action of the air cylinder moving its piston rod 52 to the left will move the entire unit including the slide 45 from its stop 98 to the guide 33. The extreme forward movement of the feeding unit is controlled by the position of the stop 98 limiting the back stroke of the piston rod. The feeding unit, before its return to the starting position, will be opened by the piston rod to free the ribbons and the clamp 36 will close on the ribbons to hold them against reverse movement.

More specifically, the cradle 23 supports not only the supplies 19 of solder ribbons 18, the clamp 36 for controlling longitudinal advancement of the solder ribbons and the guide 33 for accurately positioning the leading end portions of the solder ribbons, but the unit for feeding the solder ribbons measured distances and the mechanism, including the air cylinder 63, for actuating the feeding unit. The predetermined lengths or end portions of the ribbons are advanced during the latter portion of each operating cycle to prepare these leading end portions of the solder ribbons for the next article movement into the applying station. The article, gripped firmly at its outer ends when moved into the applying station, is a flexible metallic ribbon and requires supports 73 in alignment with the electrodes 60 and 61 when they are lowered under suitable pressures to assure satisfactory electrical contacts with the ribbon. The supports permit these satisfactory electrical contacts to be formed and prevent flexing of the article. The upper ends of the supports 73 are positioned to move directly beneath the article after it has been moved into the applying position and to move away from the article at the end of the operating cycle of the apparatus prior to the next intermittent motion of the turret 12. The carriage 25 is necessary in supporting the cradle and to move the cradle from its normal or starting position, free of the holders 14—15 moving successive articles 16 into the applying position between periods of rest of the turret 12, to move the cradle during each period of rest to position it accurately with respect to the article so that the leading end portions of the solder ribbons will be positioned above the article. The cradle is then rocked to lower the end portions of the solder ribbons with sufficient force to firmly engage the upper surface of the article while the adjacent portion of the article is heated to melt the end portions. During this interval the melted end portions remain connected to the solder ribbons but, prior to the end of the heating period, the cradle is rocked a further distance counterclockwise to break the ribbons from the melted end portions thereof, leaving the melted end portions on the predetermined spots or portions of the article. These actions are completed during approximately three-quarters of the operating cycle and during the final one-quarter of the operating cycle the solder ribbons are released, advanced longitudinally like major distances and again gripped to condition the apparatus for the next operating cycle.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. An apparatus for depositing a quantity of fusible material on metallic articles singly moved in a given path successively into an applying station, the apparatus comprising a pair of electrodes supported normally above the path, means actuable to move the electrodes under pressure into engagement with the article upon opposing sides of an area where solder is to be deposited, means operable to cause an electrical heating current to flow through the electrodes and the area of the article to heat the area, means to move a given length of an end portion of a ribbon of solder longitudinally over the heated area, means to move the ribbon downwardly a given distance to lay the given length of the end portion on the heated area to be melted thereon, and means actuable after melting of the end portion to move the ribbon downwardly a farther distance relative to the article to separate the ribbon from the melted length of the end portion.

2. An apparatus for depositing a quantity of fusible material on metallic articles singly moved in a given path successively into an applying station, the apparatus comprising a pair of electrodes supported normally above the path, means actuable to move the electrodes under pressure into engagement with the article upon opposing sides of an area where solder is to be deposited, means operable to cause an electrical heating current to flow through the electrodes and the area of the article to heat the area, a cradle disposed beyond the path, means carried by the cradle to advance a ribbon of solder longitudinally to locate its leading end portion at a given position relative to the cradle, means operable to impart one motion to the cradle to locate the end portion of the ribbon of solder over the heated area of the article, means operable to impart a second motion to the cradle to cause it to lay the end portion of the ribbon on the heated area of the article, and means operable to impart a third motion to the cradle to sever the ribbon from the end portion after the end portion is melted by the heated area of the article.

3. An apparatus for depositing a quantity of fusible material on metallic articles singly moved in a given path successively into an applying station, the apparatus comprising a pair of electrodes supported normally above the path, means actuable to move the electrodes under pressure into engagement with the article upon opposing sides of an area where solder is to be deposited, means operable to cause an electrical heating current to flow through the electrodes and the area of the article to heat the area, a cradle disposed beyond the path, means carried by the cradle to advance a ribbon of solder longitudinally to locate its leading end portion at a given position relative to the cradle, a carriage rockably supporting the cradle mounted normally away from the path and movable toward the path a given distance to cause the cradle to position the leading end portion of the ribbon over the heated area of the article, and means actuable to impart first and second rocking motions to the cradle, the first causing the cradle to lay the end portion of the ribbon on the heated area of the article and the second causing breaking of the ribbon from the end portion after the end portion is melted by the heated area.

4. An apparatus for depositing a length of fusible material on metallic articles singly moved in a given path successively into an applying station, the apparatus comprising means to heat the article at the applying station sufficiently to melt a fusible material laid thereon, means to advance an elongate fusible material longitudinally to locate a given length of the leading end of the material above the article, means to cause downward movement of the material to lay the given length of the leading end thereof on the heated article, and means actuable subsequent to the melting of the length of the leading end to cause relative movement of the article and the unmelted material to thereby retain the melted length of the material on the article and separate it from the unmelted portion.

5. An apparatus for depositing a length of fusible material on metallic articles singly moved in a given path successively into an applying station, the apparatus comprising a cradle disposed adjacent the applying station, means supported by the cradle and movable thereon to advance an elongate fusible material to locate a given length of the leading end of the material above the article in the applying station, means energizable to heat each article at the applying station sufficiently to melt the length of material when laid thereon, means actuable to move the cradle a given distance relative to the heated article to lay the length of material thereon, and means actuable to move the cradle a further distance, subsequent to the melting of the length of material on the article, to separate the material from the melted length.

6. An apparatus for depositing a quantity of fusible material on metallic articles singly moved in a given path successively into an applying station, the apparatus comprising a cradle disposed beyond the path, a supply of ribbon-like fusible material supported by the cradle, a guide for the material mounted on an end of the cradle adjacent the path, a unit actuable to advance the material from the supply through the guide a known distance intermittently to position a given length of the leading end of the material over each article when in the applying station, the unit having a member reciprocably slidable the known distance intermittently on the cradle and having a surface disposed at one side of the material, a gripper mounted on the member for movement between an open position free of the material and a closed position where it will firmly hold a portion of the material firmly on the surface of the slidable member, means supported by the cradle and operated intermittently to apply alternate forces in opposite directions to the gripper, one closing the gripper on the material and moving it with the slidable member to feed the length of material over the article and the other to open the gripper and return the member free of the material to a starting position, means to heat an area of the article to melt the length of the leading end of the material when laid thereon, means to move the cradle to lay the length of the leading end of the material firmly on the heated area of the article, means rockably supporting the cradle, and separate means imparting spaced movements to the cradle, the first to laying the length of material on the heated area of the article and the second actuable after the length of the material is melted to move the material to separate it from the melted length.

References Cited in the file of this patent

UNITED STATES PATENTS

| | | |
|---|---|---|
| 1,749,684 | Wright | Mar. 4, 1930 |
| 1,806,188 | Adams | May 19, 1931 |
| 2,263,294 | Fluke | Nov. 18, 1941 |
| 2,846,561 | Pityo | Aug. 5, 1958 |